(No Model.) 2 Sheets—Sheet 1.
W. J. LANE.
HARROW.
No. 338,531. Patented Mar. 23, 1886.
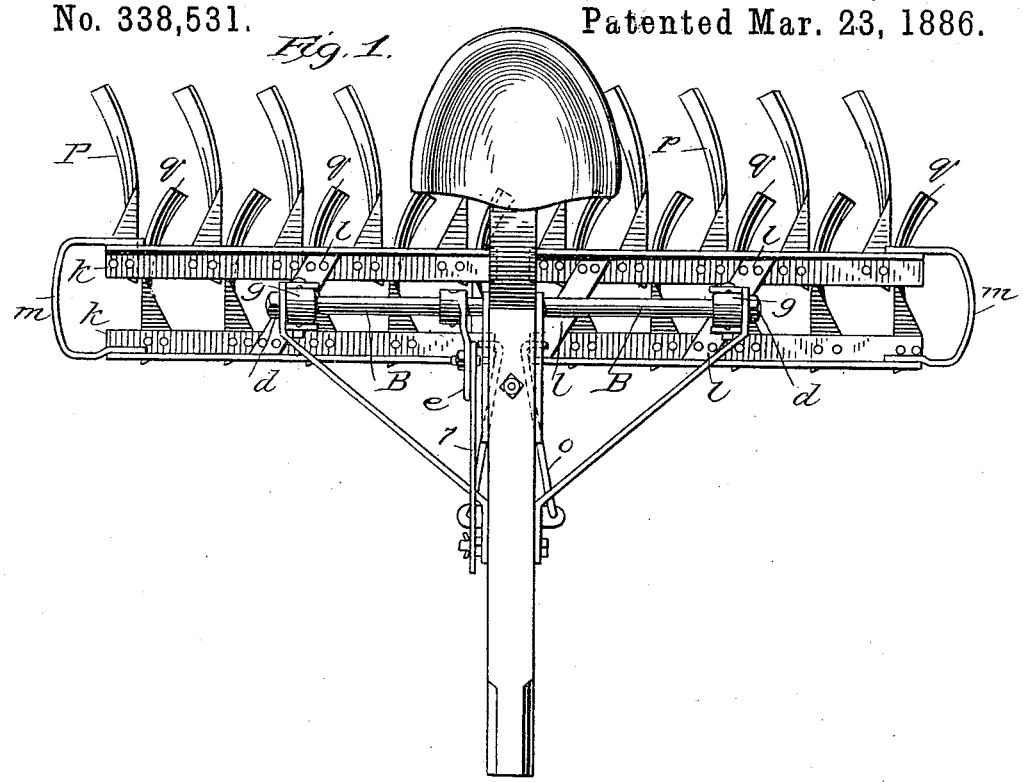
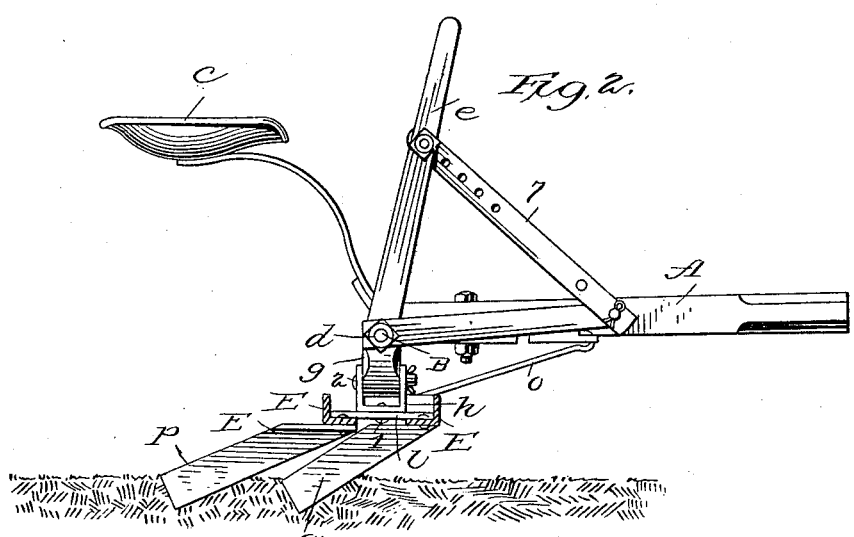
Attest:
Walter Donaldson
F. L. Middleton
Inventor
Wm J. Lane
by Joyce & Spear
Att'ys.

(No Model.) 2 Sheets—Sheet 2.

W. J. LANE.
HARROW.

No. 338,531. Patented Mar. 23, 1886.

Attest:
Walter Donaldson
F. L. Middleton

Inventor
Wm J. Lane
by Joyce & Spear
Attys.

United States Patent Office.

WILLIAM J. LANE, OF POUGHKEEPSIE, NEW YORK.

HARROW.

SPECIFICATION forming part of Letters Patent No. 338,531, dated March 23, 1886.

Application filed November 19, 1885. Serial No. 183,260. (No model.)

*To all whom it may concern:*

Be it known that I, WILLIAM J. LANE, of Poughkeepsie, in the county of Dutchess and State of New York, have invented a new and useful Improvement in Harrows; and I do hereby declare that the following is a full, clear, and exact description of the same.

My invention relates to harrows of the class having swiveled heads adjustable from the position transverse to the position parallel with the line of draft, whereby the harrow may be adapted to work or to be drawn to or from the field. These heads carry two sets of teeth or blades, and are made in the form of the frame, all as hereinafter explained.

Figure 3:
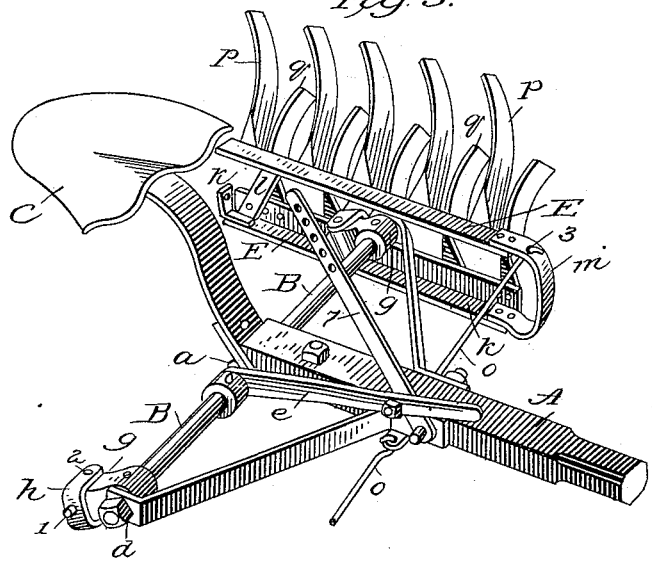
Figure 4:
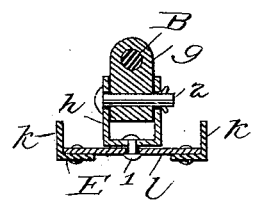

In the accompanying drawings, Figure 1 is a plan view. Fig. 2 is a side elevation, with the gang-bars in section. Fig. 3 is a perspective view showing the position of the parts when the apparatus is ready to be moved from place to place, one of the gang-bars being removed. Fig. 4 is a separate view of the swivel-joint.

This harrow is provided with a pole, A, having in its rear end an eye or bearing, $a$, in which is journaled a transverse shaft, B. This end also carries a seat, C, upon a suitable standard. The outer ends of the shaft pass through braces, being held thereto by nuts $d$ $d$. The shaft is rocked by means of a lever, $e$, fixed to the shaft near the pole, and held adjustably on the pivoted standard. On each end of the shaft is fixed a stout arm, $g$, to the lower end of which is attached the frame or gang-bars E by means of the swivel $h$. These gang-bars are in the form of a frame composed of angle-irons, $k$ $k$, with cross-bars $l$ $l$ and $m$, the bars $m$ being of bow form and connecting the ends. It will be observed that the frame turns upon the bolt 1, which connects it to the swivel, and also upon the bolt 2, which connects the swivel to the arm, the two bolts being set at right angles to each other. The frames have movement on these bolts in two planes, and a third movement is imparted to the frames by the rocking of the shaft. When the frames are set at right angles to the line of draft, the inner ends are near each other, and they are held by rods $o$ $o$, the front ends of which are connected to eyes set upon the side of the pole and the rear ends into holes in the inner ends of the frames. This holds the frames at right angles to the line of draft, and at the same time allows the frames to adjust themselves on the pivoted bolts 2 to the inequalities of the ground. This is the position for harrowing. In order to put the frames into position for removing the implement to or from the field, these rods are unhooked, and the lever which rocks the shaft is shifted to its lower position on the locking-standard, which throws the arms $g$ toward a horizontal position. Then the arms are swung around, turning on the pivoted bolt 2 until they are brought to the position at right angles to the shaft. They are held in this position by the rods $o$, which are now hooked into holes 3 in the front ends of the frames. The frames have movement in vertical planes on the pivoted bolt 1 of the swivel, to allow them to be adapted to the uneven ground, and they ride on the lower side of the frames as all runners. The connecting-rods are so arranged in relation to the holes in the inner end of the frame as to be held parallel when in this position, and at the same time they allow some free movement vertically.

I now proceed to describe the novel construction and arrangement of the teeth or blades. These blades are marked $p$ $q$, the letter $p$ indicating the set upon the rear bar, and $q$ the set of blades on the front bar of the frame. The blades are set inclined, and the upper ends of the blades are bent on a diagonal line, leaving a triangular piece at right angles to the lower part, this triangular piece forming the face which bears upon the under side of the frame to which it is riveted, which rivet passes through the triangular piece and the bar of the frame. The rearwardly-extending blades are bent laterally and slightly twisted, so as to get a slightly turned-up soil. The blades are stiffened by the triangular bent edges, which extend a sufficient distance to the rear for that purpose. The rear ends of the blades are sufficiently elastic to pass any obstruction which they may meet. On the front bars of the frames are similar blades, $q$, set in a reversed direction, with a spring, and occupying the spaces between the rear blade or alternate with the rear blades. These front rows of blades extend underneath the rear rows and to a line about half-way between the front and rear ends of the rear rows; but as both rows are inclined, they all cut to about approximately the same depth.

The construction thoroughly pulverizes the soil and is very effectual for cutting up the weeds.

I have described the lever by means of which the shaft is rocked as attachable only from its extreme upper and lower position, the first being the working position, and second the position in which the shaft is run when the frames are set for riding from the field; but this lever may also be used to move the frames, causing the blades to cut to a greater or less depth. The lever is held to the standard by means of the studs, bolt, and key, the bolt being set in the lever and passing through holes 5 5 in the standard 7. This holds it in securely locked position.

It will be observed that the cross-pieces form the front ends of the runners when the frames are so used.

In order to regulate the position of the teeth and to prevent the drifting which would necessarily ensue when one set of teeth cut deeper than the other, I provide the standard 7 with holes, and the lever e can be set in any one of the series, thereby regulating the height of the teeth so as to cause them to cut evenly.

Having thus described my invention, what I claim is—

1. The combination, in a harrow, of a pole, a rocking shaft journaled upon the pole, and a pair of frames swiveled to arms upon the end of the rocking shaft, the said frames carrying sets of blades upon the front and rear thereof, substantially as described.

2. The combination, in a harrow, of a pole, a rocking shaft journaled upon the pole, and a pair of frames composed of angle irons connected rigidly together by cross-pieces, said angle-irons supporting sets of blades, and the said frames being swiveled upon the arms of the rocking shaft, substantially as described.

3. In combination with the rocking shaft and its arms, the swiveled frames carrying the sets of blades, said frames being composed of side bars connected rigidly together by cross-pieces, and having a bow front, forming the front ends of the side when they are used as runners.

4. In combination with the rocking shaft and its arms, the swiveled frames consisting of the bars k k, connected rigidly to each other by cross-pieces, each of said bars carrying a set of blades or teeth, substantially as described.

In testimony whereof I have signed my name to this specification in the presence of two subscribing witnesses.

WILLIAM J. LANE.

Witnesses:
 JOHN G. LANE,
 JOHN M. JANES.